United States Patent [19]
Wiggs

[11] Patent Number: 5,419,135
[45] Date of Patent: May 30, 1995

[54] SPACE-BASED POWER GENERATOR

[76] Inventor: B. Ryland Wiggs, 3630 Villanova Ct., Bethlehem, Pa. 18017

[21] Appl. No.: 839,962

[22] Filed: Feb. 21, 1992

[51] Int. Cl.[6] .............................................. F03G 6/00
[52] U.S. Cl. ..................... 60/641.15; 60/641.8; 60/667
[58] Field of Search .................. 60/641.8, 641.15, 676, 60/667

[56] References Cited

U.S. PATENT DOCUMENTS

| | | | |
|---|---|---|---|
| 2,968,916 | 1/1961 | Taylor et al. | 60/641.8 |
| 3,995,429 | 12/1976 | Peters | 60/641.8 |
| 4,055,948 | 11/1977 | Kraus et al. | 60/641.8 |
| 4,192,144 | 3/1980 | Pierce | 60/641.8 |
| 4,232,523 | 11/1980 | Derby et al. | 60/641.15 |
| 4,320,663 | 3/1982 | Francia | 60/641.8 |
| 4,423,599 | 1/1984 | Veale | 60/641.8 |
| 4,781,173 | 11/1988 | Ven et al. | 60/641.8 X |

Primary Examiner—Stephen F. Husar
Attorney, Agent, or Firm—Eckert Seamans Cherin & Mellott

[57] ABSTRACT

A power generation system for use in outer space includes a radiation receiver disposed for receiving energy from solar, stellar or planetary heat radiation. The radiation receiver includes at least two evaporator cells. Each of the evaporator cells has an inlet, an outlet, a passageway for a refrigerant, and is constructed of a heat absorptive and conductive material. Energy from the solar, stellar or planetary radiation is absorbed by the radiation received and transferred to the refrigerant for changing the refrigerant from a liquid to a gas. The refrigerant gas is directed to a turbine or other engine wherein the gas is expanded and energy is released in the form of rotation of a shaft. The turbine shaft may be coupled to a generator for converting the mechanical rotational energy to electrical power, or to a hydraulic or pneumatic pressure device arranged to store power by compression of a fluid or a gas. The refrigerant gas discharged from the turbine is cooled/condensed in a condenser disposed in an area shaded from the solar radiation, and directed toward a heat sink such as a cooler planet or toward deep space. The refrigerant liquid is recirculated to the radiation receiver, and the process is performed continuously. In an alternative embodiment, a pair of refrigerant loops are thermally coupled via a heat transfer apparatus. One of the loops includes a compressor which enables continuous system operation under all temperature conditions.

10 Claims, 1 Drawing Sheet

SPACE-BASED POWER GENERATOR

BACKGROUND OF THE INVENTION

1. Field of the Invention

The invention relates to the field of power generation systems for use on spacecraft and/or on other heavenly bodies with little or no atmosphere (e.g., on the moon). More particularly, the invention concerns a power generation system which extracts power using a Rankine cycle engine having a refrigerant circulating between a relatively hotter area exposed to solar radiation and a relatively cooler area shaded from solar radiation.

2. Prior Art

Vehicles operating in outer space require mechanical and/or electrical power for various operating systems such as communications, guidance, computers, artificial environment, etc. This power must be generated on board. Several different sources of power generation have been utilized on space vehicles, either alone or in combination. Solar power electrical systems, for example, utilize large panels having photovoltaic cells for converting solar energy to electrical power. Nuclear power systems have been utilized which use nuclear fuels to generate power in a small scale nuclear reactor. Also, fuel cells which combine hydrogen and oxygen to provide electrical power have been employed. Such fuel cells are utilized extensively on the space shuttle. Additionally, magnetohydrodynamic power generation systems for space based vehicles have been proposed and are under development.

Spacecraft power generation systems have some unique requirements due to the need to conserve weight and volume in the spacecraft, and due to the fact that the spacecraft is isolated by the vacuum of space. With reference to these unique aspects of spacecraft, prior art power generation systems have been characterized by certain shortcomings in equipment size, weight, and efficiency. For example, photovoltaic solar panels typically yield efficiencies only in the thirty percent to fifty percent range, and thus require extremely large surface areas for generation of any substantial portion of the spacecraft's power requirements. It is difficult to transport large solar panels into outer space, particularly if a number of panels are required, and it is also difficult to deploy them. Solar panels are easily damaged by space debris. Further, solar panels are undesirable for secret space systems because their large size and vulnerability to damage make them easy targets.

Consequently, for space vehicles requiring relatively large amounts of power, the prior art has resorted to fuel cells or nuclear generators. The fuel cells and nuclear generators are heavy and bulky since they effectively carry their power source in a self contained manner. The weight of such power generation apparatus decreases the weight of potential payloads and takes up valuable cargo space. Nuclear reactor fuel systems require heavy shielding and also are dangerous because an aborted launch or a problem with attaining and/or maintaining orbit can result in dangerous and virtually irreparable contamination of the earth or sea.

Whereas the size and weight of power generation systems are very important for spacecraft applications, the efficiency of such systems is important. A more efficient smaller and/or lighter system which can provide the same power as a larger or heavier one is of course desirable. All power generation systems are typically less than one hundred percent (100%) efficient, and the fuel cells which are currently used to provide electrical power for the space shuttle are only forty percent (40%) to a potential maximum of approximately seventy percent (70%) efficient in extracting the power available from their self-contained fuel supplies.

There is a need for a reliable power generation system for use on spacecraft which is smaller, lighter and more efficient than the prior art power generation systems. Further, there is a need for a space based power generation system of this type which obtains energy from outside sources and does not require storage or replenishment of fuel. Similar needs apply for power generation systems which can be sent to and employed at a base on the moon or other heavenly body with little or no atmosphere to support convective cooling. The present invention provides these and other advantages by utilizing naturally occurring temperature differences between areas exposed to solar radiation and areas shaded from solar radiation.

SUMMARY OF THE INVENTION

It is an object of the invention to provide an apparatus for efficiently generating power for space based operations by extracting thermal energy from solar radiation in a Rankine cycle engine.

It is another object of the invention to provide a power generation system for space based operations which is efficient, lightweight and compact.

It is a further object of the invention to provide a power generation system for space based operations which can operate indefinitely and does not require replenishment of a fuel supply.

It is yet another object of the invention to provide a power generation system for space based operations which utilizes naturally existing conditions in space to generate significant amounts of power.

These and other objects are accomplished by an apparatus for generating power in space comprising radiation receiver means disposed for receiving energy from solar radiation. The radiation receiver means includes at least two evaporator cells. Each of the evaporator cells has an inlet, an outlet, and a passageway for a refrigerant. The evaporator cells are constructed of heat conductive materials, thus placing the refrigerant in thermal communication with the cell structure. The energy from the solar radiation is absorbed and transferred to the refrigerant in the evaporator cells for phase changing the refrigerant, from a liquid to a gas. The apparatus also includes an energy extraction means for extracting energy from the refrigerant gas. The energy extraction means is preferably a turbine engine which is coupled to an electrical generator for producing electrical power. The apparatus further includes a condenser which is disposed in an area shaded from the solar radiation and arranged to radiate excess heat. In the condenser, the refrigerant gas is cooled and changed in phase back to a liquid. A conduit system connects the radiation receiver means, the energy extraction means, and the condenser for communicating the refrigerant between successive stages in the apparatus. The space based power generation system can be carried on a vehicle or can be permanently mounted, for example on the moon or other heavenly body.

The temperature difference between the evaporator cells and the condenser defines a source of energy that can be tapped for production of electrical power. The efficiency of operation can be enhanced by means for concentrating solar energy on the evaporators, and by means for increasing the rate at which heat on the cooler side is emitted into space.

BRIEF DESCRIPTION OF THE DRAWINGS

There are shown in the drawings embodiments of the invention as presently preferred. It should be understood, however, that the invention is not limited to the exemplary arrangements and instrumentalities shown in the drawings, wherein.

DETAILED DESCRIPTION OF THE PREFERRED EMBODIMENTS

Figure 1:
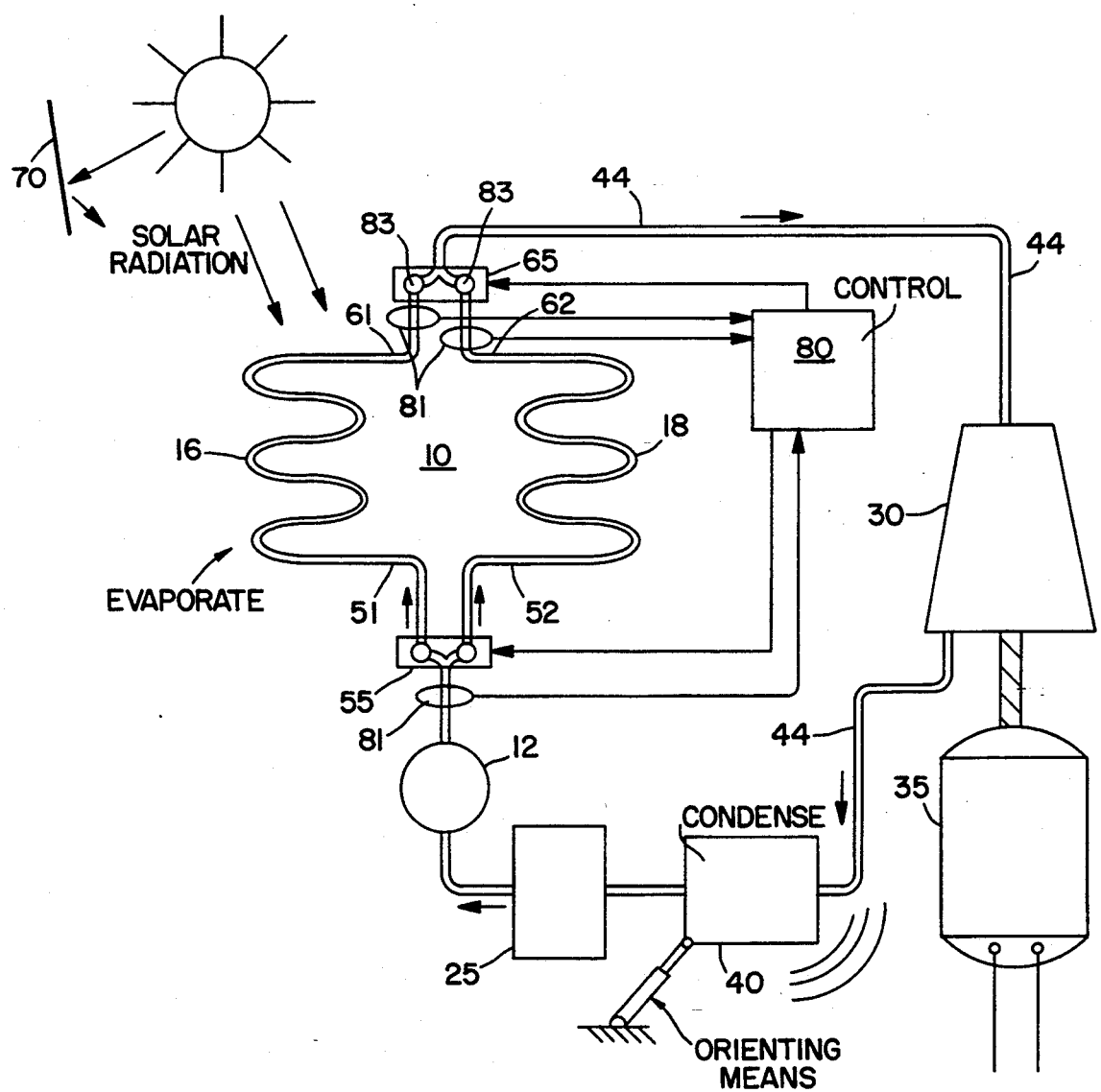
FIG. 1 is a schematic view illustrating an exemplary embodiment of the apparatus for generating power in outer space according to the invention.

An apparatus for generating power in outer space according to the invention utilizes naturally occurring temperature differentials present in space to operate a Rankine cycle generator of mechanical and electrical power. The temperature difference between relatively hotter areas exposed to stellar (e.g., solar) radiation and relatively colder areas shaded from the solar or stellar radiation cause phase changes in a refrigerant gas. A suitable refrigerant gas such as helium is circulated in a hermetically sealed, closed loop, refrigeration system. Other refrigerants are also possible, the choice of refrigerant being made with respect to the temperatures expected such that the temperature differences between the hotter and cooler side provide a phase change in the refrigerant. A combination of refrigerant gases may also be selected for optimum performance.

As shown schematically in FIG. 1, the apparatus includes a radiation receiver means 10 which is disposed for receiving energy from the sun or other astronomical body. The radiation receiver means 10 is preferably mounted on a space vehicle so as to be protected from dynamic forces during launch and ascent into the vacuum of space, whereupon the radiation receiver means will be exposed directly to the environment of space to facilitate reception of solar radiation. The space shuttle is particularly well-suited for carrying the apparatus according to the invention because the space shuttle includes a cargo bay having cargo bay doors which are closed during launch and reentry into the atmosphere. When in space, the cargo bay doors are readily opened. The radiation receiver means 10 could thus be mounted in the cargo bay or on the cargo bay doors so that it is protected during launch and reentry and exposed to solar radiation when in space. The space based power generation system can also be mounted permanently, for example on the moon or on another heavenly body, particularly where there is little or no atmosphere to support convective cooling on the condenser side of the apparatus.

For a spacecraft orbiting Earth, another planet or a moon, the spacecraft will periodically be shaded from direct solar radiation as it passes through the shadow of the Earth or other astronomical body. During such times, the evaporators can be oriented toward the closest astronomical body to intercept low grade heat radiated therefrom and thus to maintain operation of the power generation system, although at a reduced power level. Alternatively, or in addition, excess energy produced by the invention when the evaporator is exposed to solar radiation can be stored and used when the spacecraft becomes shaded.

The radiation receiver means includes at least two evaporator cells 16, 18. Each of the evaporator cells has an inlet 51, 52 and an outlet 61, 62 respectively, and defines a passageway for the refrigerant. The passageway includes a tube or conduit which can define a serpentine configuration and is coupled in thermal communication with radiation absorptive fins or panels. The evaporator cells 16, 18 are constructed from a radiation absorptive and heat conductive material such as copper, stainless steel, aluminum, a lightweight alloy and/or other suitable metal or heat conductive material. The evaporator cells can be coated, for example with a coating comprising silver and/or Teflon, or painted black, for improved heat absorption and conductivity. The evaporator cells absorb the solar radiation received thereon which raises the temperature of the cells. Heat energy from the solar radiation is transferred to the refrigerant, thereby heating the refrigerant and changing the refrigerant from a liquid to a gas. If desired, the solar radiation incident on a large area can be concentrated on the evaporator cells using mirrors 70 formed of metallized mylar or the like.

The phase change of the refrigerant due to heating results in a pressure increase in the evaporator passageways. The control valves may also be timed sequence valves which are set to release the refrigerant gas from each evaporator cell in alternating sequence at timed intervals via a controller and/or microprocessor 80. The control valves may be pressure-operated shutoff valves coupled to open at a predetermined pressure. The control valves may also be timed sequence valves which are set to release the refrigerant gas from each evaporator cell in alternating sequence at timed intervals. The controller and/or microprocessor 80 may be employed with pressure and/or temperature sensing devices 81 and may be coupled via wires 82 to suitable valve actuators and/or drivers 83 such as solenoids, for opening the control valves 55, 65 in a optimum manner, which optimum manner can be predetermined and programmed into the controller and/or microprocessor via storage, for example, of a series of algorithms designed to select and set the valve at an optimal efficiency setting depending upon sensor device 81 monitored refrigerant temperatures and/or pressures.

The refrigerant gas is released from the evaporator cells under pressure and is communicated through a conduit 44 to an energy extraction means 30 which converts the energy of the pressurized refrigerant to mechanical energy. The energy extraction means can be a turbine engine, reciprocating engine, rotary engine, inertial engine, stirling engine, scroll engine or the like for extracting energy from the pressurized refrigerant gas. The refrigerant gas is expanded in the turbine or the like, and the energy of the gas is used to effect mechanical rotation of the turbine shaft. The shaft may be coupled to any apparatus which can appropriately utilize the mechanical energy, and preferably is arranged to store the energy by mechanical, electrical or chemical means, such as via hydraulics (e.g. energy storage via fluid compression) and/or batteries and/or electrolysis. For example, the shaft may be coupled to an electric generator means 35 for generating electrical power, which can be utilized by coupling to the electric powers mains of the space craft, or stored via hydraulic fluids or gases, electrolysis, or batteries.

After expansion and energy extraction, the refrigerant gas is circulated through a condenser means 40 disposed in an area shaded from the solar radiation. In the condenser means 40, the refrigerant gas gives up excess heat and is converted back to a liquid in order to maintain system operational temperature/pressure differentials. Cooling of the refrigerant gas may be accomplished in the vacuum of space via radiation of waste heat into deep space. The heated refrigerant is circulated through a space radiator functioning as the condenser means. The space radiator includes finned tubing, honeycombed panels or similar large surface area radiators which comprise copper, aluminum and/or other suitable metal or heat conductive material. The space radiator can be coated, for example with a coating of silver and/or Teflon, for improved thermal emissivity. The space radiator is kept shaded from direct solar or stellar heat radiation and positioned to face continuously into deep space which acts as a heat sink. Accordingly, it is convenient to place the evaporators and the space radiators on opposite sides of the spacecraft or to provide a movable mounting whereby the opposite facing structures can be oriented to face respectively toward the sun and away from the sun and/or earth.

The size of the space radiator can be reduced by accomplishing cooling in a flash evaporator or by arranging the space radiator to exude water or other liquid to provide evaporative cooling. For example, excess waste water produced from fuel cells can be sprayed onto the radiator or emitted via pores communicating with additional conduits provided in the space radiator from which the water evaporates immediately in the vacuum of space, carrying away heat. Alternatively, heat from the refrigerant gas can be transferred in a heat exchanger to stored liquid nitrogen, liquid oxygen, or other super cold entity. The space shuttle currently uses several types of space radiators to dissipate excess heat. One type is a standard space radiator which is periodically used when the space shuttle cargo bay doors are opened. This space radiator includes aluminum tubes of approximately three-eighths inch diameter spaced several inches apart in aluminum honeycombed panels coated with silver and/or Teflon. Another type of space radiator is the flash evaporator type which operates via spraying water on a heat exchanger core under a low pressure. The space radiators used on the space shuttle are appropriate for use in the apparatus according to the invention.

After the refrigerant has been returned to a liquid phase in the condenser means, it is recirculated, via a liquid refrigerant pump, back to the radiation receiver means, and the process is continuously repeated.

The power generation system preferably includes an accumulator 25 to maintain and discharge an appropriate amount of refrigerant into the system depending on the heat source and heat sink being utilized. When direct solar radiation is being used as the heat source, system pressures and flow rates will be high and may approach dangerous levels unless refrigerant is withdrawn from the system. Conversely, when low grade heat radiation from a planet or moon is being used as the heat source, system pressures and flow rates will be low and additional refrigerant must be added to the system in order to obtain optimum pressure and flow conditions. A control device such as a controller and/or microprocessor 80 associated with the accumulator 25, which accumulator 25 comprises a storage container for accumulating and holding liquid refrigerant, and which accumulator 25 may also be identified as a receiver; with said accumulator 25, or receiver, being associated with the controller and/or microprocessor 80 via wires 82 connected from the controller and/or microprocessor 80 to the pump 12, which wires 82 enable the controller and/or microprocessor 80 to direct the pump 12 to either speed up and pump more refrigerant into the radiator receiver means 10 when operational temperatures and pressures are relatively low, or to slow down and pump less refrigerant into the radiator receiver means 10 when operational temperatures and pressures are relatively high, thereby controlling the quantity of refrigerant in the working system so as to optimally correspond to actual and varying heat source/heat sink conditions. Absent continuous and correct adjustment of the refrigerant supply by means of the speed of the pump 12, which speed is controlled by the controller and/or microprocessor 80, which level and degree of control is based upon predetermined pressure and/or temperature differentials and/or conditions, which are programmed into the controller and/or microprocessor 80, and which are sensed by the pressure and/or temperature sensors 81, which relay their status to the controller and/or microprocessor 80 by means of wire connections 82, continuous efficient refrigerant phase change could not be continuously accomplished.

A multitude of the apparatus according to the invention can be combined in a "space farm" to generate power for a space colony or station on the moon or on a planet. Further, such a "space farm" can be utilized to provide safe and abundant power for transmission back to earth via microwave or other device. The apparatus provides power without requiring replenishment of a fuel supply, without the pollution problems of a fossil fueled plant, and without the radiation dangers of a nuclear plant. The apparatus is especially suited to provide power for a space station, a moon base, a or space vehicle orbiting the earth, or an orbiting communications and/or weapons system.

The invention having been disclosed, a number of variations will now become apparent to those skilled in the art. Whereas the invention is intended to encompass the foregoing preferred embodiments as well as a reasonable range of equivalents, reference should be made to the appended claims rather than the foregoing discussion of examples, in order to assess the scope of the invention in which exclusive rights are claimed.

I claim:

1. Apparatus for generating power in outer space, comprising:

radiation receiver means disposed for receiving energy from an astronomical body, the radiation receiver means including at least two evaporator cells, each of the evaporator cells having a heat conductive construction and defining an inlet, an outlet, and a passageway for a refrigerant, wherein the energy from the astronomical body is transferred to the refrigerant for changing the refrigerant from a liquid to a gas;

control valve means for selectively directing the refrigerant through different ones of said evaporator cells;

energy extraction means for extracting energy from the refrigerant gas;

condenser means disposed in an area shaded from the energy from the astronomical body for converting the refrigerant gas to a liquid;

conduit means connected for communicating the refrigerant successively between the radiation receiver means, the energy extraction means, and the condenser means; and, at least one accumulator means and a controller coupled to sensing means and to the accumulator means, for adjusting a volume of the refrigerant to optimize operation of the apparatus under different conditions.

2. The apparatus according to claim 1, further comprising pressure valve means for preventing flow of the refrigerant gas to the energy extraction means until the refrigerant gas reaches a pre-selected pressure.

3. The apparatus according to claim 1, further comprising timed sequence valve means for sequentially permitting flow of the refrigerant gas from each of the evaporator cells.

4. The apparatus according to claim 1, wherein the energy extraction means is one of a turbine engine, a stirling engine, a scroll engine, a reciprocating engine, a rotary engine and an inertial engine.

5. The apparatus according to claim 1, further comprising means for orienting the condenser means to face away from the astronomical body.

6. The apparatus according to claim 5, wherein said means for orienting is operative to face the condenser means toward deep space.

7. The apparatus according to claim 1, wherein the condenser means comprises a portion of the conduit means.

8. The apparatus according to claim 1, further comprising generator means operatively coupled to the energy extraction means for producing electrical power.

9. The apparatus according to claim 1, wherein the controller comprises microprocessor means operable for monitoring and regulating at least one of a pressure of the refrigerant and a quantity flow rate of the refrigerant.

10. The apparatus according to claim 1, further comprising reflective means defining a relatively larger area than an area of the evaporator, arranged to concentrate on the evaporator heat radiation incident on said reflective means.

* * * * *